United States Patent  
Phillips et al.

(10) Patent No.: US 11,318,885 B2
(45) Date of Patent: May 3, 2022

(54) VEHICLE VISION SYSTEM

(71) Applicant: Phillips Connect Technologies LLC, Santa Fe Springs, CA (US)

(72) Inventors: Robert Phillips, Sante Fe Springs, CA (US); Theron Davis, Santa Fe Springs, CA (US); Stephen Bennett, City of Industry, CA (US)

(73) Assignee: Phillips Connect Technologies LLC, Santa Fe Springs, CA (US)

( * ) Notice: Subject to any disclaimer, the term of this patent is extended or adjusted under 35 U.S.C. 154(b) by 0 days.

(21) Appl. No.: 16/818,965

(22) Filed: Mar. 13, 2020

(65) Prior Publication Data

US 2020/0290515 A1 Sep. 17, 2020

Related U.S. Application Data

(60) Provisional application No. 62/819,515, filed on Mar. 15, 2019.

(51) Int. Cl.
*H04N 5/00* (2011.01)
*B60R 1/00* (2006.01)
*B60R 11/04* (2006.01)
*H04N 5/265* (2006.01)
*H04N 5/247* (2006.01)
*B60R 11/00* (2006.01)

(52) U.S. Cl.
CPC .............. *B60R 1/002* (2013.01); *B60R 11/04* (2013.01); *H04N 5/247* (2013.01); *H04N 5/265* (2013.01); *B60R 2011/004* (2013.01); *B60R 2300/105* (2013.01); *B60R 2300/20* (2013.01); *B60R 2300/303* (2013.01); *B60R 2300/802* (2013.01)

(58) Field of Classification Search
CPC .......... B60R 2300/20; B60R 2300/802; B60R 1/002; B60R 2011/004; B60R 2300/806; B60R 2300/303; B60R 11/04; B60R 1/00; B60R 2300/105; H04N 5/265; H04N 5/2257; H04N 5/247

See application file for complete search history.

(56) References Cited

U.S. PATENT DOCUMENTS

| | | | |
|---|---|---|---|
| 2002/0125383 A1* | 9/2002 | Takahashi | B62D 25/084 248/200 |
| 2018/0029550 A1* | 2/2018 | Campbell | B60R 19/26 |
| 2018/0095057 A1* | 4/2018 | McQuillen | G01N 29/024 |
| 2018/0099631 A1* | 4/2018 | Jayachandran | B60R 19/14 |
| 2019/0054877 A1* | 2/2019 | Rastegar | B60R 19/023 |
| 2020/0238936 A1* | 7/2020 | Schumacher | B60R 19/50 |

* cited by examiner

*Primary Examiner* — Zhihan Zhou
(74) *Attorney, Agent, or Firm* — Haynes and Boone, LLP

(57) ABSTRACT

A vehicle vision system including an isolation block configured to compress under pressure, a rigid block on an interface surface of the isolation block configured to distribute pressure across the interface surface of the isolation block, the rigid block including a first protrusion extending away from the interface surface and having a cavity, and a camera embedded within the cavity and configured to capture video images.

15 Claims, 9 Drawing Sheets

VEHICLE VISION SYSTEM

CROSS-REFERENCE TO RELATED APPLICATIONS

This application claims priority to and the benefit of U.S. Provisional Application No. 62/819,515, filed on Mar. 15, 2019, the entire contents of which is incorporated herein by reference.

FIELD

The invention relates to an integrated vision system for a motor vehicle.

BACKGROUND

With recent advancements in electronics, the number of advanced safety features included in vehicles has increased. One such safety feature is the back-up camera system that provides the driver a clear rearview of other vehicles or elements that are situated behind the vehicle. Such a system is of particular interest in the field of heavy duty trucking as the large size of the trailer often prevents the driver from being able to see the back of the vehicle using a rearview mirror or side mirrors. Conventional back up camera solutions generally include mounting one or more rearview cameras to the top rear of the trailer. However, when backing up into a loading dock, the vehicle often comes into forceful contact with the dock, and if the force is great enough, the impact can dislodge or disorient the top mounted cameras. Repairing the camera system, after such an incident, can lead to vehicle down time and operational and maintenance costs for the carrier. What is desired is a robust camera solution that is both durable and capable of providing a clear picture to the driver.

The information disclosed in this Background section above is only for enhancement of understanding of the background of the invention and therefore it may contain information that does not form the prior art that is already known to a person of ordinary skill in the art.

SUMMARY

Aspects of embodiments of the invention are directed to vehicle vision systems including one or more camera-embedded bumpers that can replace conventional bumpers in a vehicle. According to some embodiments, the camera-embedded bumper concurrently acts as a shock-absorbing guard that reduces or eliminate the damage caused by an impact with an object or obstruction and provides a view of the rear of the vehicle to detect obstacles outside of a driver's field of view.

According to some embodiments of the present invention, there is provided a vehicle vision system including: an isolation block configured to compress under pressure; a rigid block on an interface surface of the isolation block configured to distribute pressure across the interface surface of the isolation block, the rigid block including a first protrusion extending away from the interface surface and having a cavity; and a camera embedded within the cavity and configured to capture video images.

In some embodiments, the cavity is a through-hole extending through the isolation and rigid blocks.

In some embodiments, the camera is attached to the rigid block, and not fixedly coupled to the isolation block.

In some embodiments, the rigid block further including a second protrusion at an opposite side of the rigid block from the first protrusion, the first and second protrusions defining a recess therebetween.

In some embodiments, the recess is configured to accommodate one or more mechanical fasteners configured to attach the isolation and rigid blocks to a side of a vehicle.

In some embodiments, the rigid block includes a tapered portion extending from a base of the rigid block and tapering away from the first and second protrusions, and the tapered portion has the cavity.

In some embodiments, the first and second protrusions are laterally spaced from an edge of the tapered portion by a set distance.

In some embodiments, the first and second protrusions have beveled inner facing edges and are separated at a distance to eliminate obstruction in a vertical field of view of the camera.

In some embodiments, the rigid and isolation blocks form a bumper configured to be attached to a rear bumper assembly of a trailer.

In some embodiments, the vehicle vision system further includes: an image processor configured to receive and process video signals from the camera for display on a screen, the screen being located within a tractor cab, wherein the image processor is communicatively coupled to the camera via a harness electrically connecting electrical systems of the trailer and tractor.

According to some embodiments of the present invention, there is provided a vehicle vision system including: a first camera-embedded bumper; and a second camera-embedded bumper spaced from the first camera-embedded bumper, each of the first and second camera-embedded bumpers including: an isolation block configured to compress under pressure; a rigid block on an interface surface of the isolation block configured to distribute pressure across the interface surface of the isolation block, the rigid block including a first protrusion and a second protrusion extending away from the interface surface and having a cavity; and a camera embedded within the cavity and configured to capture video images.

In some embodiments, the first and second camera-embedded bumpers are configured to be attached to a rear bumper assembly of a trailer, and the first camera-embedded bumper is configured to provide a driver-side bumper view and the second camera-embedded bumper is configured to provide a passenger-side bumper view.

In some embodiments, the vehicle vision system further includes: an image processor configured to receive video feeds from the first and second camera-embedded bumpers, and to combine the video feeds to generate a single wide-angle rear view for display on a screen.

In some embodiments, the combining of the video feeds includes cropping a portion of images from each of the first and second camera-embedded bumpers, superimposing portions of the images and blending perspectives of the video feeds.

In some embodiments, the camera is attached to the rigid block, and not fixedly coupled to the isolation block.

In some embodiments, the rigid block includes a tapered portion extending from a base of the rigid block and tapering away from the first and second protrusions, and the tapered portion has the cavity.

In some embodiments, the first and second protrusions have beveled inner facing edges and are separated at a distance to eliminate obstruction in a vertical field of view of the camera.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention, but are intended to be illustrative only.

DETAILED DESCRIPTION

The detailed description set forth below in connection with the appended drawings is intended as a description of illustrative embodiments of a vehicle vision system in accordance with the present invention, and is not intended to represent the only forms in which the present invention may be implemented or utilized. The description sets forth the features of the present invention in connection with the illustrated embodiments. It is to be understood, however, that the same or equivalent functions and structures may be accomplished by different embodiments that are also intended to be encompassed within the spirit and scope of the present invention. As denoted elsewhere herein, like element numbers are intended to indicate like elements or features.

Figure 1A:
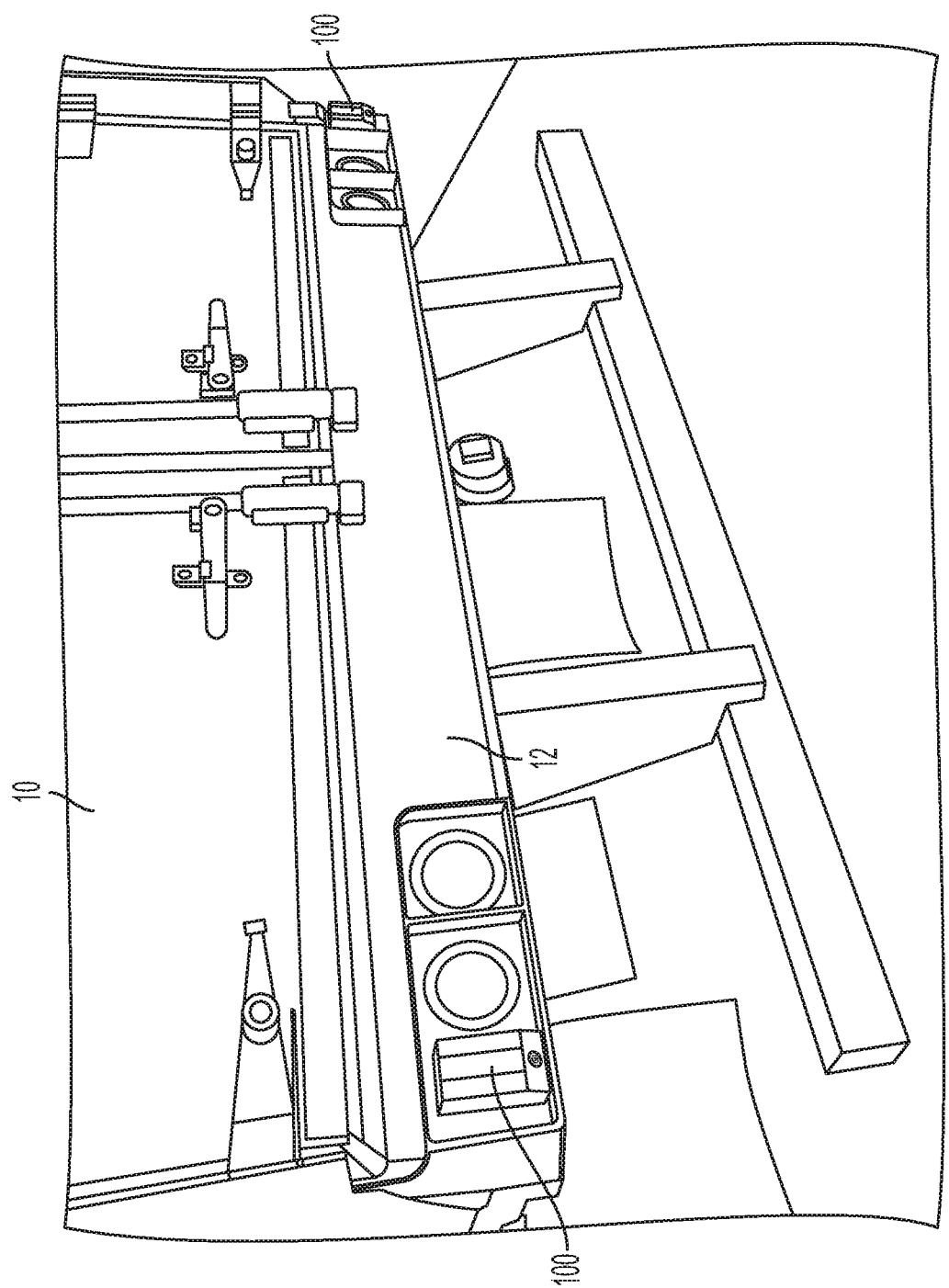
FIG. 1A illustrates trailer utilizing a pair of camera-embedded bumpers, according to some exemplary embodiments of the invention.
Figure 1B:
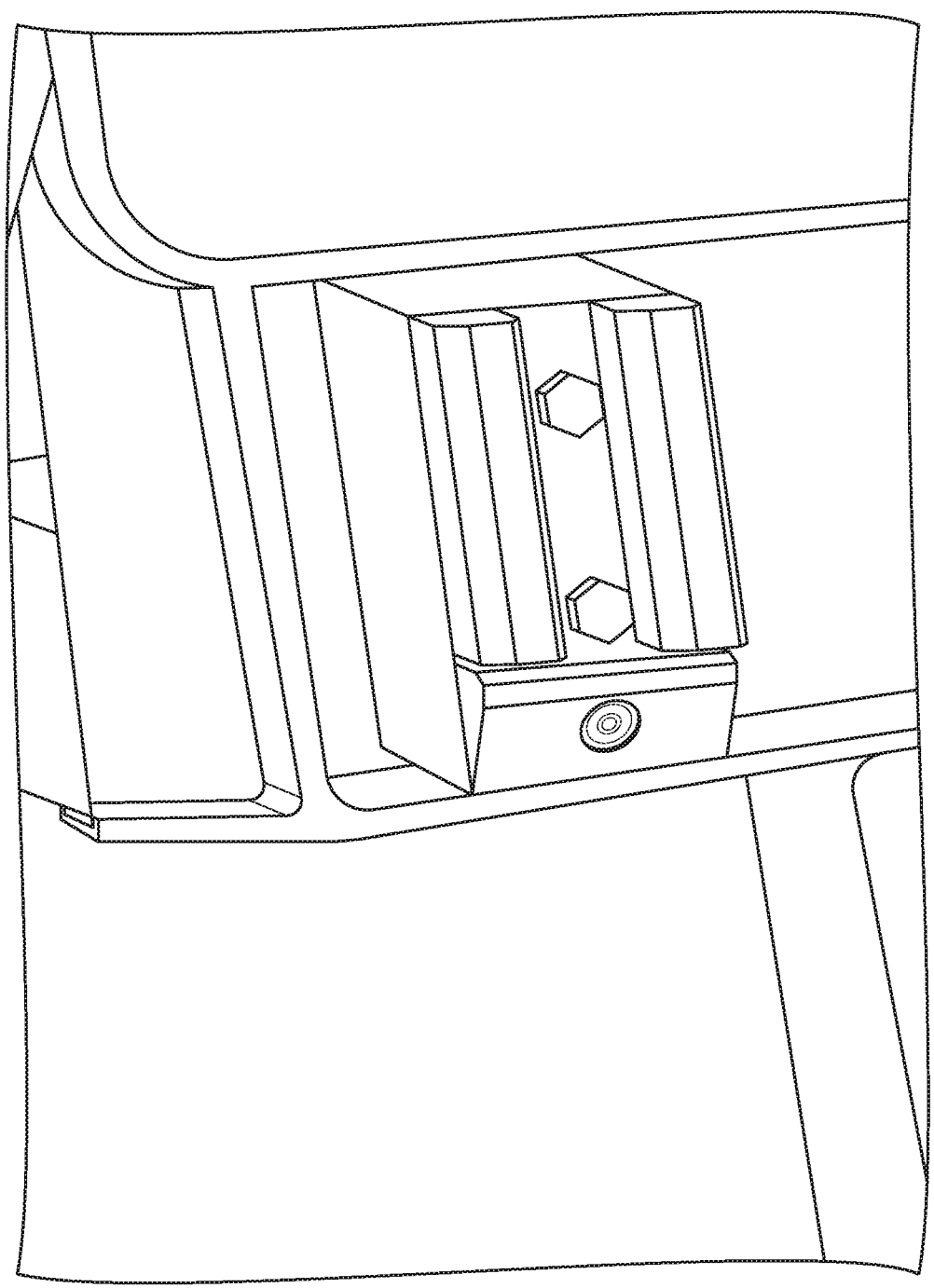
FIG. 1B provide a closer perspective view of a driver-side camera-embedded bumper of FIG. 1A.

FIG. 1A illustrates trailer 10 utilizing a pair of camera-embedded bumpers 100, according to some exemplary embodiments of the invention; FIG. 1B provide a closer perspective view of a driver-side camera-embedded bumper 100 of FIG. 1A; and FIG. 1C provides a partial frontal view of one or the camera-embedded bumpers 100 of FIG. 1A.

Figure 1C:
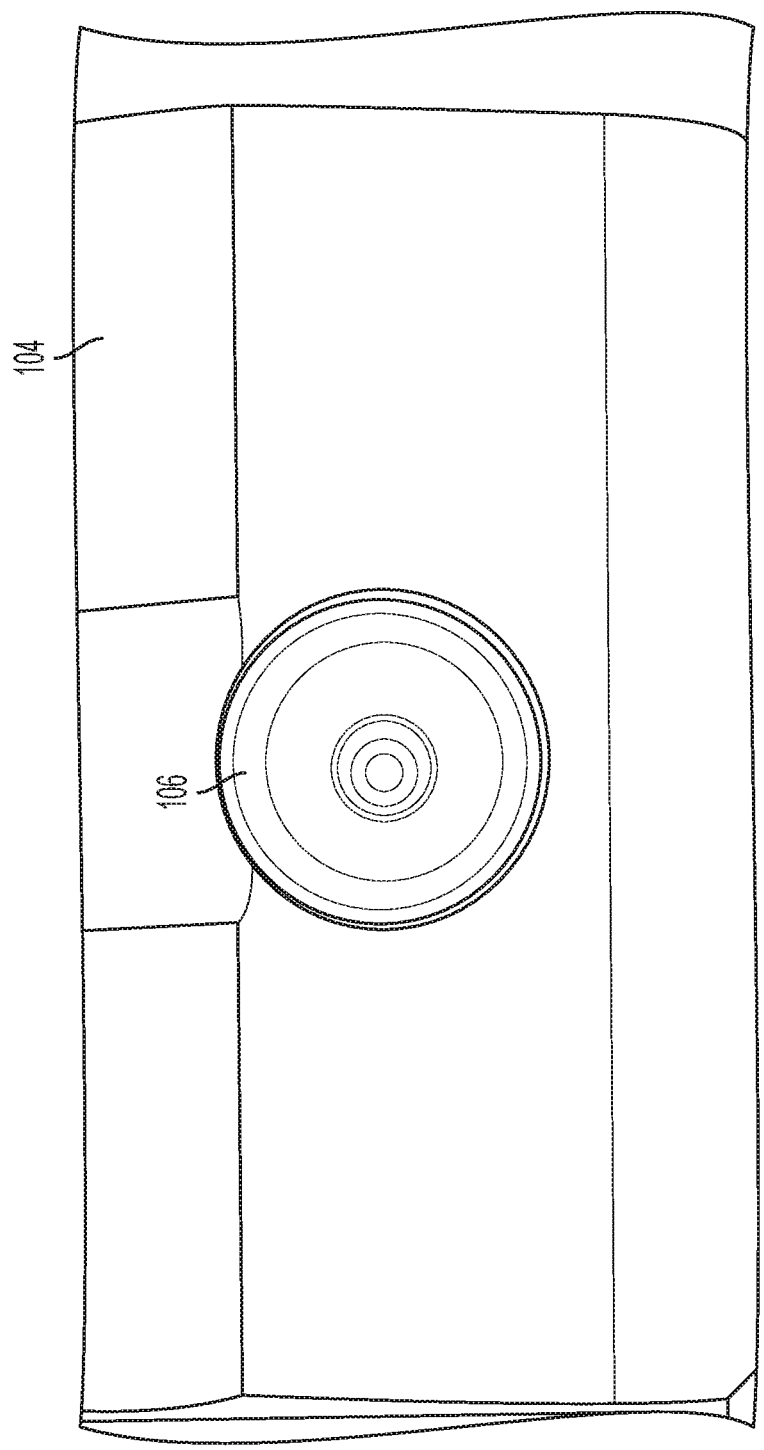
FIG. 1C provides a partial frontal view of one or the camera-embedded bumpers of FIG. 1.

Referring to FIGS. 1A-1C, according to some embodiments, one or more camera-embedded bumpers 100 may be mounted to the back of a trailer 10. In some examples, a pair of the camera-embedded bumpers 100 may be mounted near opposite ends of the rear bumper assembly 12 of the trailer 10, and may replace conventional rubber bumpers that would otherwise be placed at those positions. The camera-embedded bumper 100 may serve a dual purpose: acting as a shock-absorbing guard that reduces or eliminate the damage caused by an impact with an object or obstruction (which may occur when, e.g., the trailer 10 backs into the object or obstruction), and providing a view of the rear of the trailer 10 to detect obstacles outside of the driver's field of view (e.g., when the truck is parking or backing into a loading dock). The trailer 10 may be any utility trailer, a cargo trailer, a semi-trailer, or the like.

According to some embodiments, the camera-embedded bumper 100 includes an isolation block 102 that interfaces with the bumper assembly 12 of the trailer 10, a rigid block 104 mounted on the isolation block 102, and a camera 106 embedded within the isolation and rigid blocks 102 and 104 and configured to capture video images. The isolation block 102 may be formed of a non-rigid (e.g., compressible) material, such as rubber, and the rigid block 104 may be formed of a high-strength, impact-resistant materials (e.g., rigid and non-pliant materials), such as high strength aluminum or steel, high strength impact resistant non-ferrous materials such as hard plastics, and or the like. The rear-facing camera 106 may be embedded within a cavity (e.g., a through-hole) extending from the isolation block 102 through the rigid block 104. In some embodiments, the rigid block 104 may serve to evenly distribute (or substantially evenly distribute) the force of impact with the bumper 100 across an entire interface surface of the isolation block 102, which reduces the localized pressure on the isolation block 102. This may lead to a reduction in localized deterioration of the isolation block 2 and to prolonging its service life.

Figure 2A:
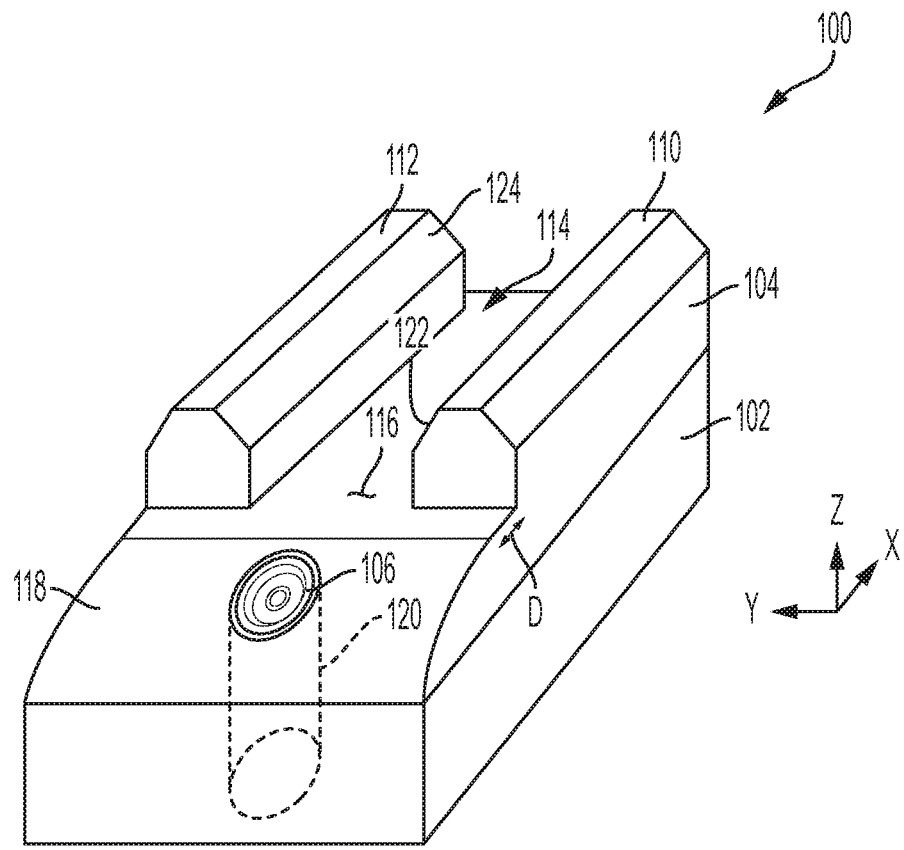
FIGS. 2A and 2B respectively illustrates a perspective view and a side view of the camera-embedded bumper, according to some exemplary embodiments of the invention.
Figure 2B:
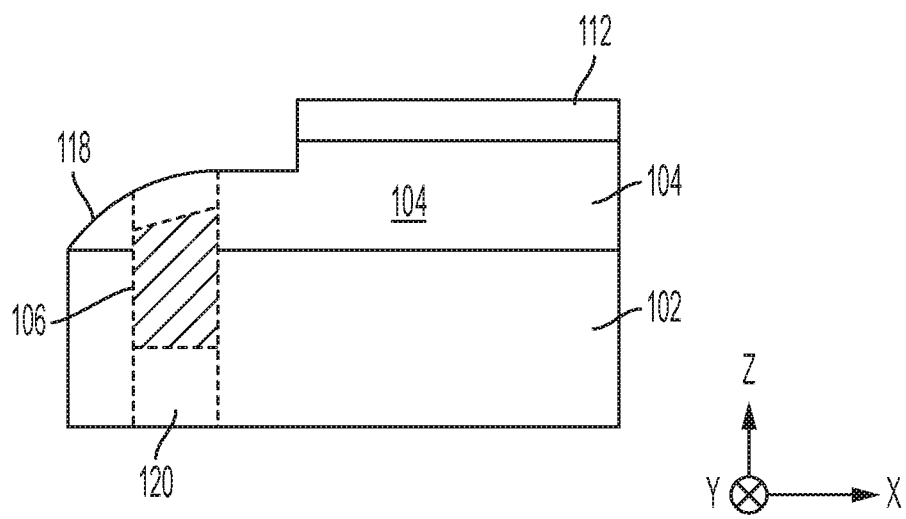
Figure 2C:
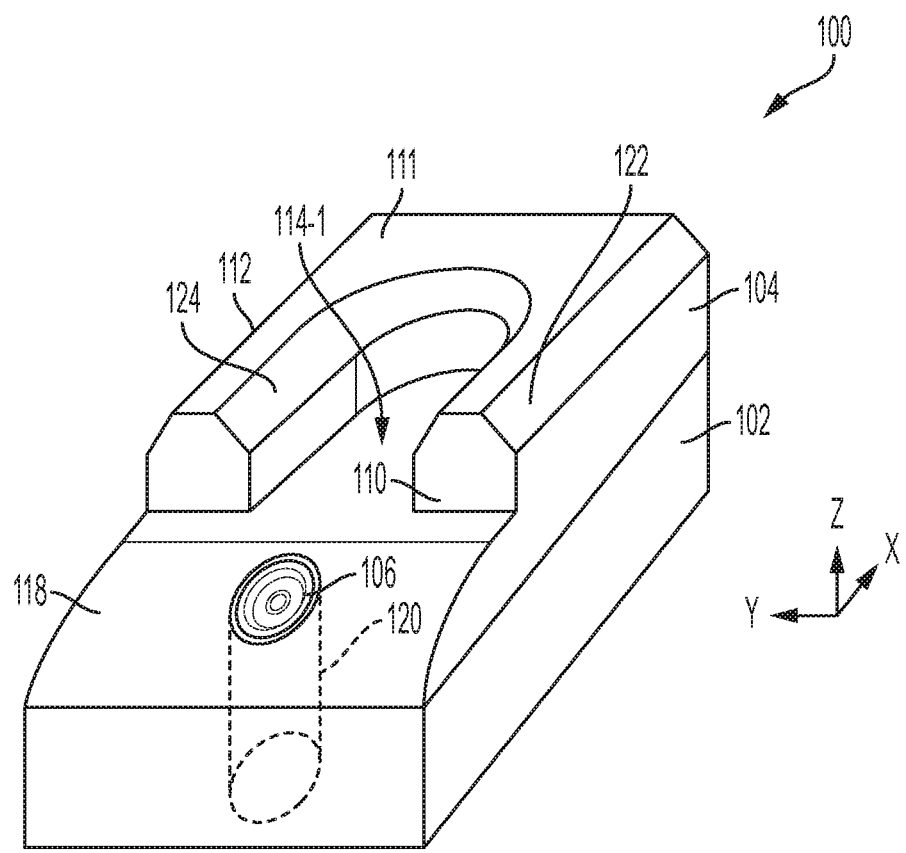
FIG. 2C illustrates a perspective view the camera-embedded bumper, according to some other exemplary embodiments of the invention.
Figure 2D:
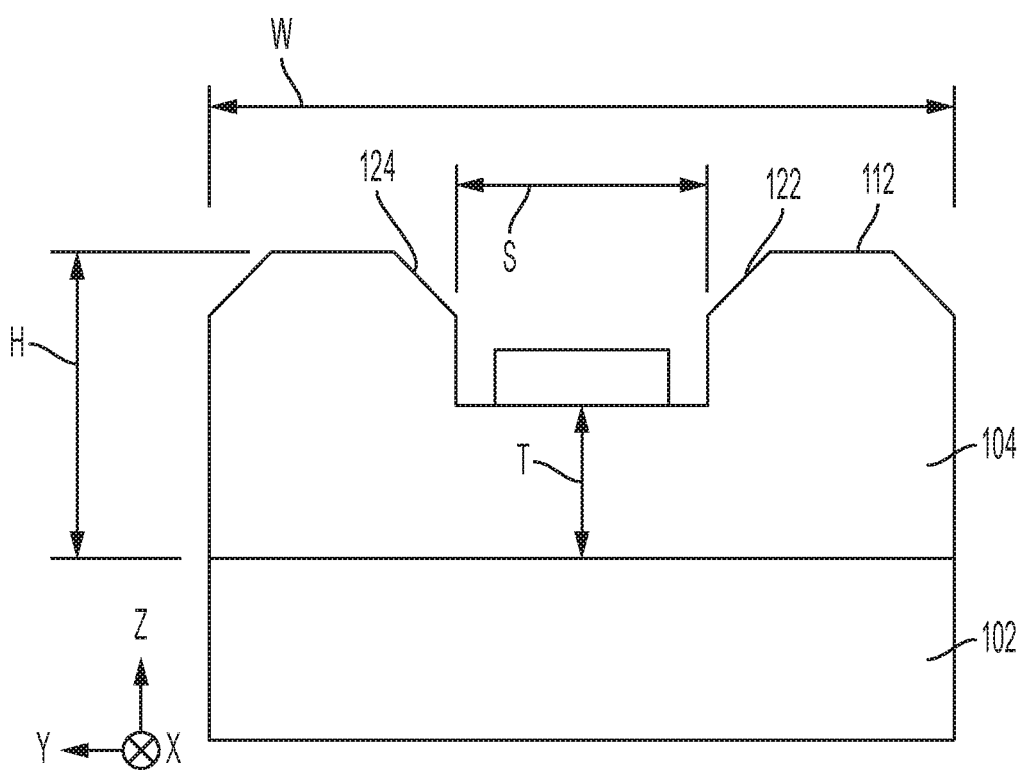
FIG. 2D illustrates a cross-sectional view of the camera-embedded bumper, according to some exemplary embodiments of the invention.

FIGS. 2A and 2B respectively illustrates a perspective view and a side view of the camera-embedded bumper 100, according to some exemplary embodiments of the invention. FIG. 2C illustrates a perspective view the camera-embedded bumper 100-1, according to some other exemplary embodiments of the invention. FIG. 2D illustrates a cross-sectional view of the camera-embedded bumper 100, according to some exemplary embodiments of the invention.

Referring to FIGS. 2A-2B, in some embodiments, the rigid block 104 includes a first protrusion 110 and second protrusion 112 at opposite sides of the rigid block 104, a recess (e.g., channel) 114 between the and two protrusions 110 and 112. The protrusions 110 and 112 may extend laterally in a first direction (e.g., along the X axis), and may be transversely spaced along a second direction (e.g., the Y axis) crossing the first direction. The protrusions 110 and 112 may protrude away from the base 116 of the rigid block 102 in a 3rd direction (e.g., the Z axis) crossing the first and second directions, thereby defining the recess/channel 114 therebetween, which may extend along the first direction.

The rigid block 104 further includes a tapered portion 118 extending from the base 116 of the rigid block 104 and tapering away from the protrusions 110 and 112 (e.g., tapering along the first direction). In some embodiments, the camera 106 is embedded in a cavity 120 formed in the tapered portion 118. According to some embodiments, the camera 106 is fixedly coupled to the rigid block 104 and not to the isolation block 102. That is, the camera 106 may be moveably coupled to the isolation block 102 (i.e., the camera 106 may not be fixedly coupled to the isolation block 102). Therefore, even when the isolation block 102 is compressed as a result of a forceful contact against the rigid block 104, the camera 106 is able to move within the cavity 120 relative to the isolation block 102, and thus does not extend out from the front of the rigid block 104 and remains securely connected to it.

According to some embodiments, the protrusions 110 and 112 are laterally spaced from the edge of the tapered portion 118 by a set or predetermined distance D and/or have inner (facing) edges 122 and 124 encompassing the recess 114 that are chamfered or beveled. The recess 114, the beveled/chamfered inner edge 122 and 124 the separation, and/or the separation D may be designed to eliminate any obstruction in the (vertical) field of view of the camera 106. For example, the angle of bevel/chamfer of the inner edges 122 and 124 and the separation D may be set to ensure that the protrusions 110 and 112 do not appear in field of view of the camera 106. While the protrusions 110 and 112 shown in FIG. 3 have angular inner edges 122 and 124, embodiments of the present invention are not limited thereto. For example, the inner surfaces of the protrusions 110 and 112 that define the recess 114 may be curved or have any other suitable shape.

Further, while, the recess 114 shown in FIG. 2A extends from the camera 106 to an opposite end of the rigid block 104, embodiments of the present invention are not limited thereto. For example, as shown in FIG. 2C, the recess 114-1 may be an indentation only partially extending in the first direction. In such examples, the first and second protrusions may be two ends of a protrusion 111 and be part of a unified body. As compared to the first and second protrusions 110 and 112 of FIG. 2A, the unitary protrusion 111 may provide a larger contact surface and greater resilience when experiencing an impact.

In some embodiments, the rigid block 104 may be secured to the isolation block 102 and the trailer bumper assembly 12 via one or more mechanical fasteners 128 (e.g., bolts or screws), which may be fixed to the base 116 of the rigid block 104 (e.g., at the recess 114/114-1). However, embodiments of the present invention are not limited thereto. For example, rigid block 104 may be adhered to the isolation block 102 or secured to it using any other suitable means.

Referring to FIG. 2D, in some examples, the isolation block 102 may have a thickness (e.g., along the first direction) of about 0.5 inches to about 2 inches (e.g., about 1 inch), the rigid block 104 may have a thickness T (e.g., along the first direction) of about 0.7 inches to about 2 inches (e.g., about 1.25 inches). The isolation and rigid blocks 102 and 104 may each have a width W (e.g., along the second direction) of about 2.5 inches to about 4 inches (e.g., about 3 inches), and may each have a length (e.g., along the first direction) of about 5 inches to about 7 inches (e.g., about 6 inches). The recess 114/114-1 may be wide enough to accommodate one or more mechanical fasteners 128. For example, the separation S between the protrusions 112 (i.e., the width of the recess 114) may be about 0.8 inches to about 1.5 inches (e.g., about 1 inch), and the thickness of the rigid block 104 at the base 116 may be about 0.5 inches to about 1 inch (e.g., about 0.625 inches).

In some embodiments, the camera-embedded bumper 100 has a form factor that the same as, or substantially similar to, a conventional bumper of a trailer bumper assembly, which allows for the camera-embedded bumper 100 to be easily installed in or retro-fitted into an existing bumper assembly.

Figure 3A:
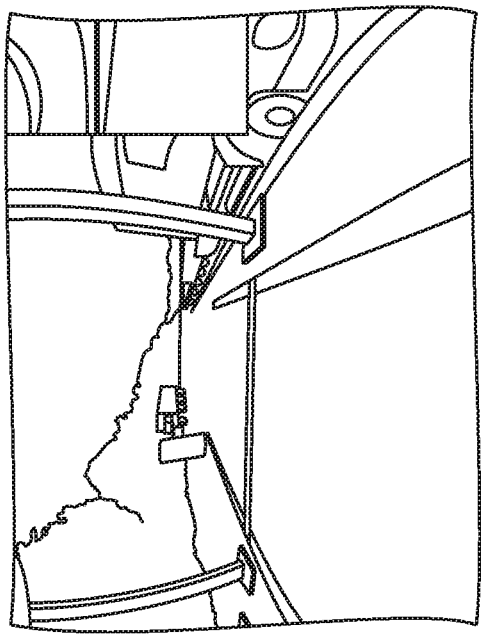
FIGS. 3A and 3B illustrate sample images of a video feed from a pair of camera-embedded bumpers mounted to the back of a trailer, according to some exemplary embodiments of the invention.
Figure 3B:
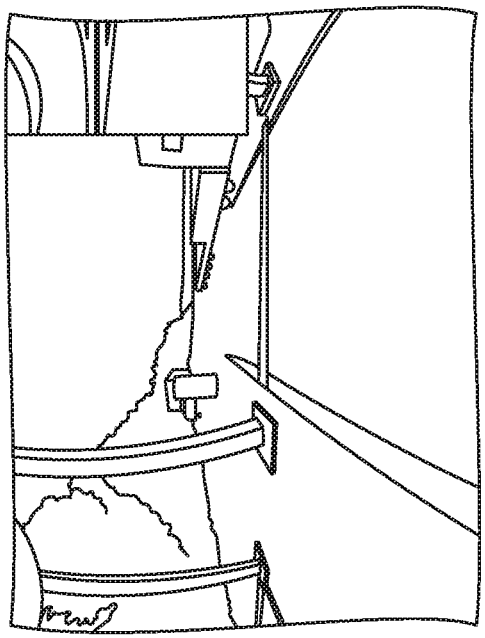
Figure 3C:
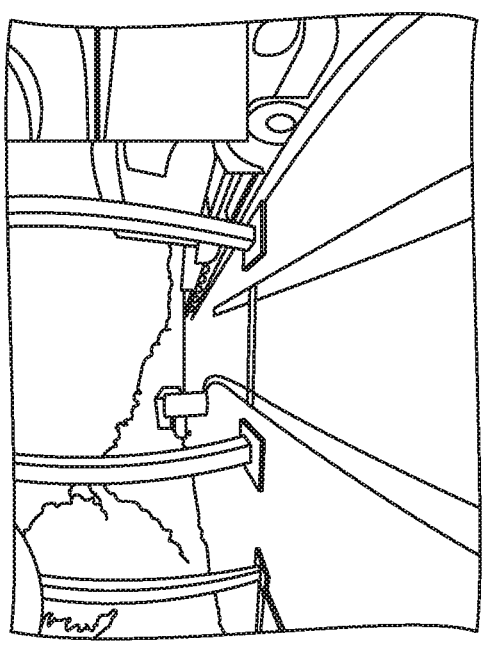
FIG. 3C illustrates a composite image of a combined video feed after processing the pair of video feeds by an image processor of the vehicle vision system, according to some exemplary embodiments of the invention.

FIGS. 3A-3B illustrate sample images of a video feed from a pair of camera-embedded bumpers 100 mounted to the back of a trailer 10, according to some exemplary embodiments of the invention. FIG. 3C illustrates a composite image of a combined video feed after processing the pair of video feeds by an image processor of the vehicle vision system, according to some exemplary embodiments of the invention.

Referring to FIGS. 3A-3C, each of the cameras 106 produces a video feed that represents either the driver-side rear bumper view or the passenger-side rear bumper view. The images from the two video feeds may be displayed side-by-side on a screen within the cab of the tractor 20 for easy viewing by the driver and/or passenger. However, in some embodiments, an image processor of the vehicle vision system combines the two video feeds to provide a single wide-angle, merged view from the back of the trailer 10. In some embodiments, the image processor generates the composite video feed by cropping a portion of the images from each camera 106, superimposing portions of the images and applying further image processing techniques to blend perspectives and provide a seamless wide-angle feed.

Figure 4:
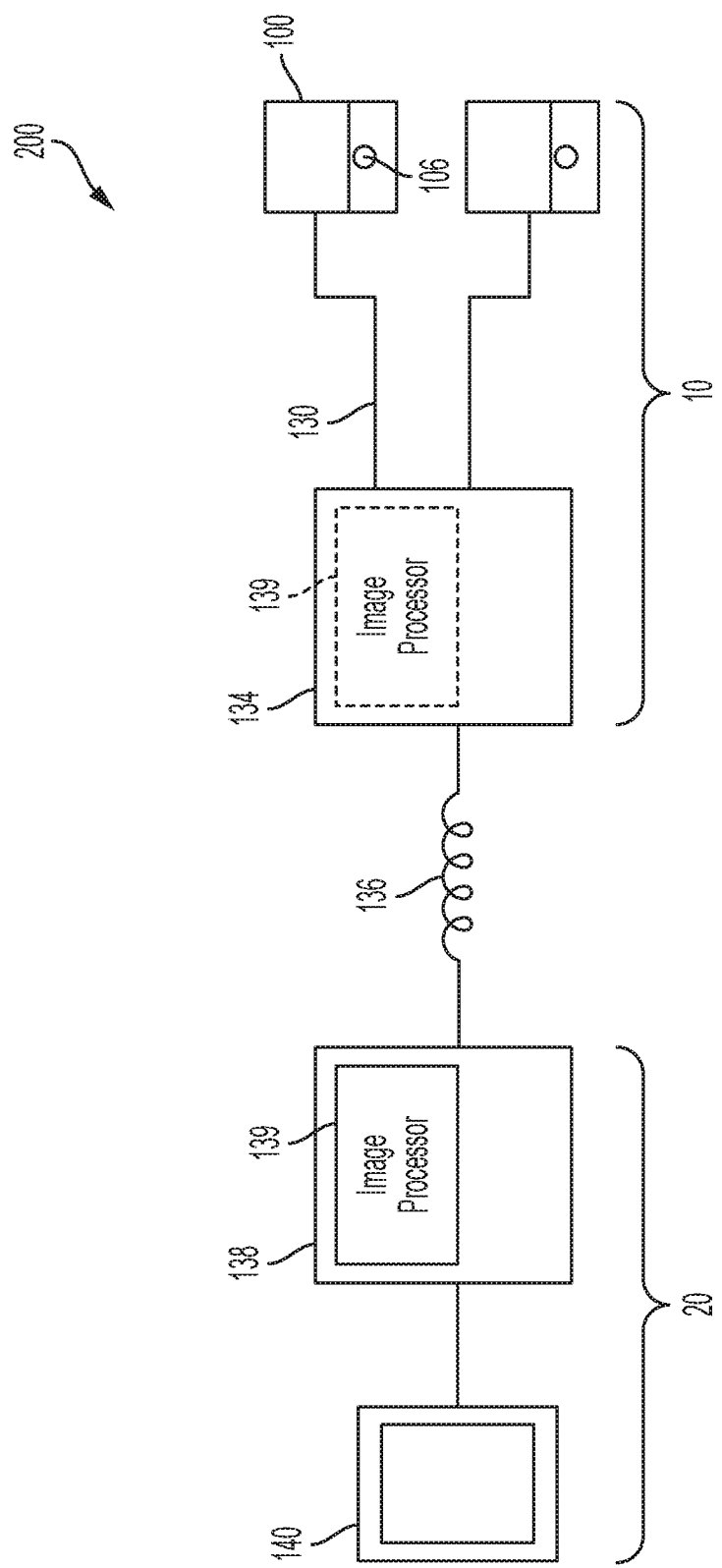
FIG. 4 is a schematic illustrating the vehicle vision system capable of providing images captured by a pair of camera-embedded bumpers at the trailer to a user in the tractor, according to some exemplary embodiments of the invention.
Figure 5:
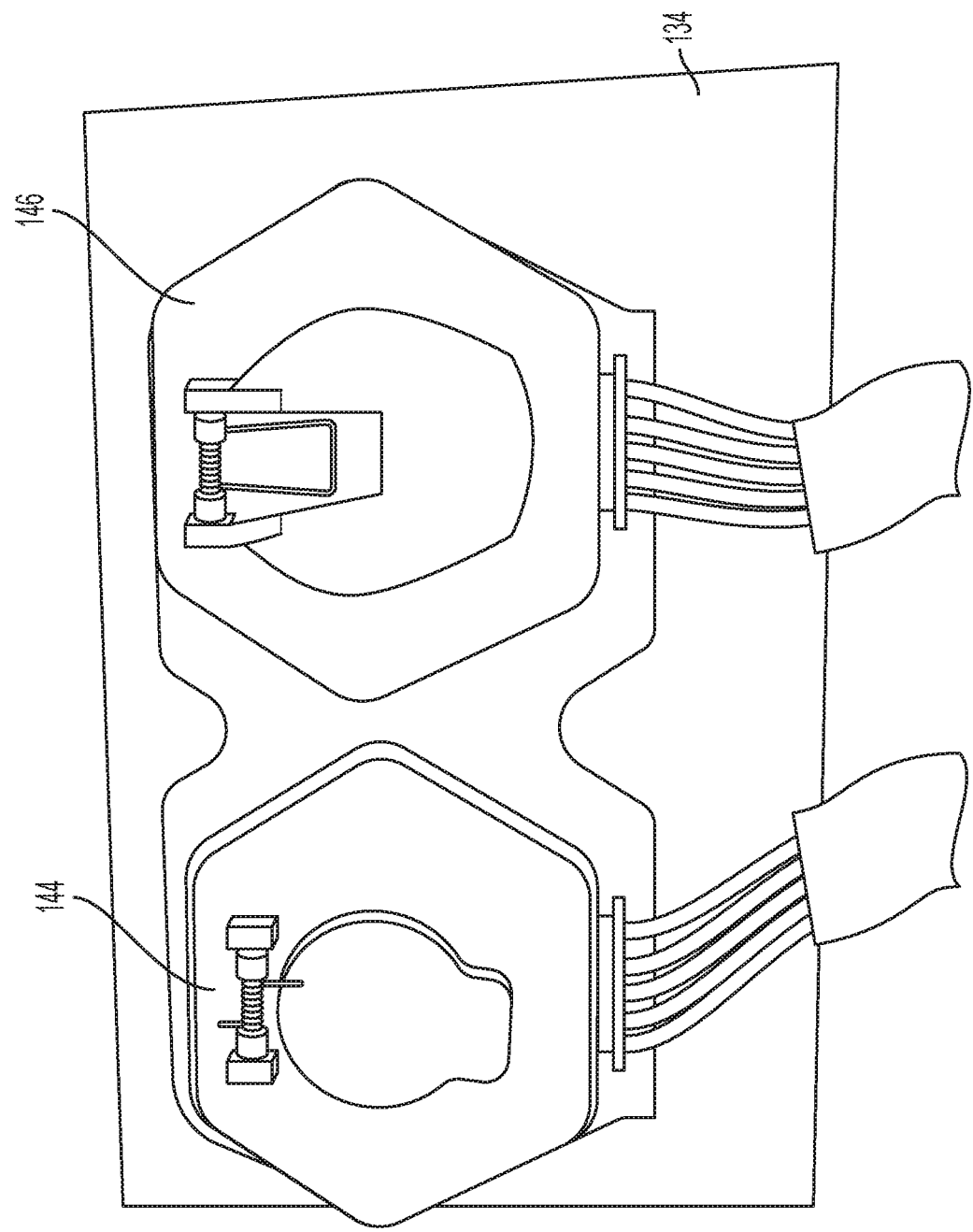
FIG. 5 illustrates a perspective view of the trailer nose box, according to some exemplary embodiments of the invention.

FIG. 4 is a schematic illustrating the vehicle vision system 200 capable of providing images captured by a pair of camera-embedded bumpers 100 at the trailer 10 to a user in the tractor 20, according to some exemplary embodiments of the invention. FIG. 5 illustrates a perspective view of the trailer nose box 134, according to some exemplary embodiments of the invention.

Referring to FIG. 4, the video signals captured by the one or more cameras 106 may be transmitted, via one or more video cables 130, to the nose box 134 (e.g., the nose box interconnect module) of the trailer 10 (which may be located at the front side of the trailer 10 facing the tractor 20), and may be supplied to the tractor 20 via a conductive harness/cable 136 that, at least partially, couples the electrical systems of the trailer 10 and tractor 20. The video signals provided to the tractor 20 may be received by a video server (e.g., a video processor) 138, which processes them for display on a screen 140. The video server 138 may be mounted inside the cab of the tractor 20. In some examples, the screen 140 may be part of a mobile tablet or phone, or may be integrated into a heads-up display, a dashboard-integrated display, a display functioning as a rear-view mirror, and/or the like.

In some embodiments, the image processor 139, which combines the video feeds from the two camera-embedded bumpers 100 into a composite feed, may be integrated within the video server 138, and thus, the video server may receive a separate video signal from each of the one or more cameras 106. However, embodiments of the present invention are not limited thereto. For example, the image processor 139 may be integrated within the trailer 10 (e.g., integrated into the trailer nose box 134), and the video server 138 may only receive a single video feed corresponding to the composite video feed.

As shown in FIG. 5, in some examples, the trailer nose box 134 may include a first socket (e.g., a 7-way socket) 144 for providing electrical power and control signals from the tractor 20 to the trailer 10, and a second socket (e.g., a 15-pin socket) 146 for monitoring and controlling the one or more cameras 106 and receiving video signals from the one or more cameras 106.

The present invention is not to be limited in scope by the specific embodiments described herein. Indeed, other various embodiments of and modifications to the invention, in addition to those described herein, may be apparent to those of ordinary skill in the art from the foregoing description and accompanying drawings. Thus, such other embodiments and modifications are intended to fall within the scope of the invention. Further, although the invention has been described herein in the context of a particular implementation in a particular environment for a particular purpose, those of ordinary skill in the art may recognize that its usefulness is not limited thereto and that the invention may be beneficially implemented in any number of environments for any number of purposes. Accordingly, the claims set forth below should be construed in view of the full breadth and spirit of the invention as described herein and equivalents thereof.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

The vehicle vision system and/or any other relevant devices or components according to embodiments of the invention described herein, such as the image processor and the video server may be implemented utilizing any suitable hardware, firmware (e.g., an application-specific integrated circuit), software, or a suitable combination of software, firmware, and hardware. For example, the various components of the vehicle vision system may be formed on one integrated circuit (IC) chip or on separate IC chips. Further, the various components of the vehicle vision system may be implemented on a flexible printed circuit film, a tape carrier package (TCP), a printed circuit board (PCB), or formed on a same substrate. Further, the various components of the vehicle vision system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

What is claimed is:

1. A vehicle vision system comprising:
an isolation block configured to compress under pressure;
a rigid block on an interface surface of the isolation block configured to distribute pressure across the interface surface of the isolation block, the rigid block comprising a first protrusion extending away from the interface surface and having a cavity, the rigid block further comprising a second protrusion at an opposite side of the rigid block from the first protrusion, the first and second protrusions defining a recess therebetween; and
a camera embedded within the cavity and configured to capture video images.

2. The vehicle vision system of claim 1, wherein the cavity is a through-hole extending through the isolation and rigid blocks.

3. The vehicle vision system of claim 1, wherein the camera is attached to the rigid block, and not fixedly coupled to the isolation block.

4. The vehicle vision system of claim 1, wherein the recess is configured to accommodate one or more mechanical fasteners configured to attach the isolation and rigid blocks to a side of a vehicle.

5. The vehicle vision system of claim 1, wherein the rigid block comprises a tapered portion extending from a base of the rigid block and tapering away from the first and second protrusions, and wherein the tapered portion has the cavity.

6. The vehicle vision system of claim 5, wherein the first and second protrusions are laterally spaced from an edge of the tapered portion by a set distance.

7. The vehicle vision system of claim 1, wherein the first and second protrusions have beveled inner facing edges and are separated at a distance to eliminate obstruction in a vertical field of view of the camera.

8. The vehicle vision system of claim 1, wherein the rigid and isolation blocks form a bumper configured to be attached to a rear bumper assembly of a trailer.

9. The vehicle vision system of claim 8, further comprising:
an image processor configured to receive and process video signals from the camera for display on a screen, the screen being located within a tractor cab, wherein the image processor is communicatively coupled to the camera via a harness electrically connecting electrical systems of the trailer and tractor.

10. A vehicle vision system comprising:
a first camera-embedded bumper; and
a second camera-embedded bumper spaced from the first camera-embedded bumper, each of the first and second camera-embedded bumpers comprising:
an isolation block configured to compress under pressure;
a rigid block on an interface surface of the isolation block configured to distribute pressure across the interface surface of the isolation block, the rigid block comprising a first protrusion and a second protrusion extending away from the interface surface and having a cavity, wherein the rigid block further comprises a tapered portion extending from a base of the rigid block and tapering away from the first and second protrusions, and wherein the tapered portion has the cavity; and
a camera embedded within the cavity and configured to capture video images.

11. The vehicle vision system of claim 10, wherein the first and second camera-embedded bumpers are configured to be attached to a rear bumper assembly of a trailer, and wherein the first camera-embedded bumper is configured to provide a driver-side bumper view and the second camera-embedded bumper is configured to provide a passenger-side bumper view.

12. The vehicle vision system of claim 10, further comprising:
an image processor configured to receive video feeds from the first and second camera-embedded bumpers, and to combine the video feeds to generate a single wide-angle rear view for display on a screen.

13. The vehicle vision system of claim 12, wherein the combining the video feeds comprises cropping a portion of images from each of the first and second camera-embedded bumpers, superimposing portions of the images and blending perspectives of the video feeds.

14. The vehicle vision system of claim 10, wherein the camera is attached to the rigid block, and not fixedly coupled to the isolation block.

15. The vehicle vision system of claim 10, wherein the first and second protrusions have beveled inner facing edges and are separated at a distance to eliminate obstruction in a vertical field of view of the camera.

* * * * *